(12) United States Patent
Asanuma et al.

(10) Patent No.: US 6,381,952 B1
(45) Date of Patent: May 7, 2002

(54) EXHAUST TEMPERATURE RAISING APPARATUS AND METHOD FOR INTERNAL COMBUSTION ENGINE

(75) Inventors: Takamitsu Asanuma; Shinya Hirota, both of Susono; Shunsuke Toshioka, Numazu; Nobumoto Ohashi, Mishima, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/696,024

(22) Filed: Oct. 26, 2000

(30) Foreign Application Priority Data

Oct. 26, 1999 (JP) .......................................... 11-304388

(51) Int. Cl.$^7$ ................................................. F01N 3/00
(52) U.S. Cl. .............................. 60/284; 60/277; 60/285; 60/286; 60/324
(58) Field of Search ........................ 60/274, 277, 284, 60/286, 324, 285

(56) References Cited

U.S. PATENT DOCUMENTS

| | | | | |
|---|---|---|---|---|
| 5,224,335 A | * | 7/1993 | Yoshizaki | ...................... 60/277 |
| 5,555,725 A | * | 9/1996 | Shimasaki et al. | ............. 60/277 |
| 5,839,275 A | * | 11/1998 | Hirota et al. | .................. 60/284 |
| 5,845,486 A | * | 12/1998 | Yamashita et al. | ............. 60/274 |
| 5,983,630 A | * | 11/1999 | Kibe et al. | ..................... 60/285 |
| 6,041,591 A | * | 3/2000 | Kaneko et al. | ................ 60/274 |
| 6,055,807 A | * | 5/2000 | Schatz et al. | .................. 60/274 |
| 6,158,212 A | * | 12/2000 | Tanaka | ......................... 60/277 |
| 6,164,065 A | * | 12/2000 | Denari et al. | .................. 60/284 |
| 6,178,743 B1 | * | 1/2001 | Hirota et al. | .................. 60/286 |

FOREIGN PATENT DOCUMENTS

| | | | |
|---|---|---|---|
| EP | | 0861973 | * 9/1998 |
| JP | (P) | SHOW 49-80414 | 8/1974 |
| JP | | 4-111540 | 9/1992 |
| JP | (P) | HEI 8-100638 | 4/1996 |
| JP | | 8-296485 | 11/1996 |
| JP | (P) | HEI 8-303290 | 11/1996 |
| JP | | 10-131792 | 5/1998 |
| JP | (P) | HEI 10-212995 | 8/1998 |
| JP | | 10-212995 | 8/1998 |
| JP | (P) | HEI 10-238336 | 9/1998 |
| JP | | 10-238336 | 9/1998 |

* cited by examiner

*Primary Examiner*—Thomas Denion
*Assistant Examiner*—Tu M. Nguyen
(74) *Attorney, Agent, or Firm*—Kenyon & Kenyon

(57) ABSTRACT

An exhaust temperature raising apparatus has an exhaust throttle valve that adjusts the engine exhaust amount based on the amount of throttling, and an injector that performs main injection and a sub-injection directly into a cylinder, a combination of an ECU, the injection and the exhaust throttle valve as exhaust gas temperature increase apparatus for, during an engine warm-up, performing and controlling the exhaust throttling by the exhaust valve and performing and controlling an exhaust gas temperature increase through combustion attributed to the main injection performed in an excess-air condition and combustion attributed to the sub-injection, an exhaust gas temperature sensor that monitors a state of temperature increase of the exhaust gas caused by performance of the exhaust gas temperature increase apparatus, and the ECU as monitor abnormality detection apparatus for determining whether the exhaust gas temperature sensor has an abnormality, and the ECU as exhaust gas temperature increase stop apparatus for stopping the operation of the exhaust gas temperature increase apparatus when the ECU determines that the exhaust gas temperature sensor has an abnormality.

12 Claims, 4 Drawing Sheets

EXHAUST TEMPERATURE RAISING APPARATUS AND METHOD FOR INTERNAL COMBUSTION ENGINE

INCORPORATION BY REFERENCE

The disclosure of Japanese Patent Application No. 11-304388 filed on Oct. 26, 1999 including the specification, drawings and abstract is incorporated herein by reference in its entirety.

BACKGROUND OF THE INVENTION

1. Field of the Invention

The present invention relates to an exhaust temperature raising apparatus and method for an internal combustion engine.

2. Description of the Related Art

Diesel engines produce large amounts of unburned HCs during low-load engine operations, and particularly during a warm-up operation, since the combustion chamber temperature is low during such operations.

There is a known technology in which an exhaust control valve is disposed in an engine exhaust passage, and the combustion chamber temperature is raised by closing the exhaust control valve and increasing the amount of fuel injected, so as to curb production of unburned HCs (see, for example, Japanese Patent Application Laid-Open No. SHO 49-80414).

When the exhaust control valve is substantially completely closed after the combustion chamber temperature has been raised by increasing the amount of fuel injected as mentioned above, the pressure in the exhaust passage, that is, the back pressure, becomes considerably high. If the back pressure is high, the exhaust gas temperature is unlikely to decrease, so that exhaust gas in the exhaust passage remains in a high temperature state. Furthermore, if the back pressure rises, the exhaust gas flow rate decreases, so that high-temperature exhaust gas resides or dwells in a portion of the exhaust passage upstream of the exhaust control valve. While exhaust gas resides in this fashion, the exhaust gas is in a high-temperature state. As a result, unburned HCs among the exhaust gas components are oxidized, and the amount of unburned HCs contained in exhaust gas emitted into the atmosphere is reduced.

In another technology for lessening unburned HCs, an emission control catalyst is disposed in an engine exhaust passage. However, unless activated, the catalyst is unable to sufficiently control emission, that is, unable to lessen unburned HCs.

There is a well-known technology in which in addition to main injection, that is, fuel injection for producing the engine output, sub-injection, that is, subsidiary fuel injection after the main injection, is performed during the expansion stroke (see, for example, Japanese Patent Application Laid-Open Nos. HEI 8-303290 and HEI 10-212995).

If the sub-injection is performed in addition to the main injection, unburned HCs produced by the combustion attributed to the main injection (hereinafter, referred to as "main combustion") are burned in the combustion attributed to the sub-injection (hereinafter, referred to as "sub-combustion"), so that the amount of unburned HCs itself decreases to a considerably low level. Furthermore, since unburned HCs produced by the main combustion burn together with the sub-injection fuel, the amount of combustion increases. As a result, the exhaust gas temperature rises so that a high catalyst temperature is achieved. Thus, the amount of unburned HCs is reduced.

Although various technologies for lessening unburned HCs have been proposed, further reduction of the amount unburned HCs is still raised as a great issue.

Therefore, the present inventors, through experiments and researches, conceived of performing the main fuel injection in an excess-air condition, and after the main fuel injection, the sub-injection is performed to increase the amount of combustion, and an exhaust control valve provided in an exhaust passage is substantially completely closed.

Due to the synergetic effect of the combustion attributed to the subsidiary injection and the exhaust throttling in this design, the oxidation of unburned HCs in the combustion chamber is accelerated and the temperature in the exhaust passage becomes high, so that the amount of unburned HCs is considerably reduced. Therefore, a considerable reduction in the proportion of unburned HCs to the total amount of exhaust gas components emitted into the atmosphere can be expected.

Based on verification of the above-described effect through experiments and researches, the present applicant has already applied for a patent regarding a technology for lessening unburned HCs by performing the main fuel injection in an excess-air condition, and performing, after the main fuel injection, the subsidiary fuel injection to increase the amount of combustion, and, in addition, by providing an exhaust control valve in an exhaust passage and operating the valve to a substantially completely closed state.

Whether unburned HCs have been normally lessened is determined based on detection values provided by various sensors, for example, an exhaust gas temperature sensor, a back pressure sensor, etc. It is conceivable that a failure in any one of the sensors can adversely affect the exhaust gas temperature. If such a sensor fails, the exhaust gas temperature cannot be monitored, so that the exhaust gas temperature control becomes impossible. As a result, the exhaust gas temperature does not remain in a temperature range of a target level (hereinafter, referred to as "target exhaust gas temperature"), so that production of unburned HCs may not be curbed.

The target exhaust gas temperature refers to an exhaust gas temperature which is sufficiently high to promote oxidation of unburned HCs, that is, generally-termed post-combustion, and which is not excessively high and therefore, if a catalyst is provided in an exhaust passage, will not cause heat deterioration of the catalyst.

Furthermore, due to a failure or defect in a fuel injection valve or a fuel injection valve control apparatus, as for example, a sufficient amount of fuel may not be injected, and therefore the exhaust gas temperature may not reach the target exhaust gas temperature, or the amount of fuel injected may be excessively large, and therefore the exhaust gas temperature may exceed the target exhaust gas temperature.

Still further, it is also conceivable that due to, for example, a sensor failure or the like, it is falsely determined that the exhaust gas temperature has not reached the target exhaust gas temperature although the exhaust gas temperature is actually higher than the target exhaust gas temperature. In such a case, an engine control unit (hereinafter, referred to as "ECU") will determine that it is necessary to burn more fuel in order to bring the exhaust gas temperature to the target exhaust gas temperature. Therefore, the catalyst may deteriorate due to overheating, or the amount of HCs produced may increase more than necessary.

SUMMARY OF THE INVENTION

Accordingly, it is an object of the invention to provide an internal combustion engine exhaust temperature raising apparatus and method capable of detecting an abnormality in sensors, fuel injection valves, or the like during an early period and therefore capable of preventing an increase in the amount of unburned HCs in exhaust gas and, if a catalyst is provided in the exhaust passage, preventing heat deterioration of the catalyst.

In accordance with a first aspect of the invention, an exhaust temperature raising apparatus for an internal combustion engine includes an exhaust throttle valve that is provided in an exhaust passage of the internal combustion engine and that adjusts an amount of an exhaust gas flowing in the exhaust passage based on an amount of throttling by the exhaust throttle valve, a fuel injection valve that performs a main injection that is a fuel injection for producing an engine output and a sub-injection that is a subsidiary fuel injection after performance of the main injection, directly into a cylinder, exhaust gas temperature increase means for, during an engine operation during which a need to lessen an unburned fuel component contained in the exhaust gas is high, performing and controlling exhaust throttling by the exhaust throttle valve and performing and controlling an exhaust gas temperature increase through combustion attributed to the main injection performed in an excess-air condition by the fuel injection valve and combustion attributed to the sub-injection, exhaust gas temperature increase monitor means for monitoring a state of temperature increase of the exhaust gas caused by performance of the exhaust gas temperature increase means, monitor means abnormality determination means for determining whether the exhaust gas temperature increase monitor means has an abnormality, and exhaust gas temperature increase stop means for stopping an operation of the exhaust gas temperature increase means when the monitor means abnormality determination means determines that the exhaust gas temperature increase monitor means has an abnormality.

Examples of the aforementioned "an engine operation during which a need to lessen an unburned fuel component contained in the exhaust gas is high" include a low-speed and low-load operation of the engine and, more particularly, a warm-up operation of the engine.

The phrase "performing and controlling exhaust throttling by the exhaust throttle valve" regarding the exhaust gas temperature increase means refers to closing the exhaust throttle valve to such a degree that an unburned fuel component, for example, unburned HCs, can be effectively lessened in conjunction with performance of combustion based on the main injection and the sub-injection; for example, it refers to closing the exhaust throttle valve to a completely closed state or a nearly completely closed state.

The "exhaust gas temperature increase means" includes the exhaust throttle valve, the fuel injection valve, and an ECU that controls the operation of the exhaust throttle valve and the operation of the fuel injection valve.

The "exhaust gas temperature increase monitor means" includes at least one sensor, such as a temperature sensor.

The "monitor means abnormality determination means" and the "exhaust gas temperature increase stop means" includes an ECU.

In this invention, when the exhaust gas temperature increase means is operated, exhaust gas temperature increases due to combustion attributed to the main injection in an excess-air condition and combustion attributed to the sub-injection. Therefore, exhaust gas discharged from the cylinder of the internal combustion engine has an increased temperature. Furthermore, a high-temperature state of exhaust gas is maintained in the exhaust passage by exhaust throttling. Therefore, the oxidation of unburned HCs is promoted in the exhaust passage, so that the amount of unburned HCs can be reduced.

The invention further achieves the following advantage. If, during the exhaust temperature raising control by the exhaust gas temperature increase means, it is determined by the monitor means abnormality determination means that the exhaust gas temperature increase monitor means is in a state in which the means cannot carry out the expected function thereof due to a failure or the like of the means (an abnormal state), the exhaust gas temperature increase stop means stops the operation of the exhaust gas temperature increase means. Therefore, the exhaust temperature raising control by the exhaust gas temperature increase means is stopped.

Therefore, it is possible to prevent unexpected increases in the amount of combustion caused by occurrence of an abnormal state, such as the aforementioned failure or the like. Thus, the apparatus is able to prevent an unexpected increase in the amount of unburned HCs and, if a catalyst is provided in the exhaust passage, prevent heat deterioration of the catalyst caused by an abnormal exhaust temperature increase.

In accordance with a second aspect of the invention, an exhaust temperature raising apparatus for an internal combustion engine includes an exhaust throttle valve that is provided in an exhaust passage of the internal combustion engine and that adjusts an amount of an exhaust gas flowing in the exhaust passage based on an amount of throttling of the exhaust throttle valve; a fuel injection valve that performs a main injection that is a fuel injection for producing an engine output and a sub-injection that is a subsidiary fuel injection after performance of the main injection, directly into a cylinder, exhaust gas temperature increase means for, during an engine operation during which a need to lessen an unburned fuel component contained in the exhaust gas is high, performing and controlling exhaust throttling by the exhaust throttle valve and performing and controlling an exhaust gas temperature increase through combustion attributed to the main injection performed in an excess-air condition by the fuel injection valve and combustion attributed to the sub-injection, exhaust gas temperature increase monitor means for monitoring a state of temperature increase of the exhaust gas caused by performance of the exhaust gas temperature increase means, exhaust gas temperature increase abnormality determination means for determining whether there is an abnormality regarding the state of temperature increase of the exhaust gas monitored by the exhaust gas temperature increase monitor means, and exhaust gas temperature increase stop means for stopping an operation of the exhaust gas temperature increase means when the exhaust gas temperature increase abnormality determination means determines that there is an abnormality regarding the state of temperature increase of the exhaust gas.

The aforementioned "an engine operation during which a need to lessen an unburned fuel component contained in the exhaust gas is high", "exhaust gas temperature increase means", "performing and controlling exhaust throttling by the exhaust throttle valve" regarding the exhaust gas temperature increase means, "exhaust gas temperature increase monitor means", and "exhaust gas temperature increase stop means" are substantially the same as described above in conjunction with the first aspect.

The "exhaust gas temperature increase abnormality determination means" includes an ECU.

In this aspect, too, the temperature of exhaust gas is increased by performance of the exhaust gas temperature increase means, so that the amount of unburned HCs can be reduced. The exhaust temperature raising apparatus also achieves the following advantages.

If, due to a problem in the exhaust gas temperature increase means, more specifically, a problem caused by a failure in, for example, a fuel injection valve, that is, a component of the exhaust gas temperature increase means, the fuel injection valve supplies an excessively large amount of fuel so that the amount of combustion in the cylinder increases and the exhaust gas temperature becomes excessively higher than a target exhaust gas temperature, the exhaust gas temperature increase abnormality determination means in this aspect of the invention determines that there is an abnormality regarding the state of exhaust gas temperature increase, and then the exhaust gas temperature increase stop means stops the operation of the exhaust gas temperature increase means. At the time of the stop, therefore, undesired excessive combustion in the cylinder discontinues. Hence, the apparatus is able to prevent an increase in the amount of HCs caused by undesired excessive combustion and, if a catalyst is provided in the exhaust passage, prevent heat deterioration of the catalyst.

In the second aspect, when the exhaust gas temperature increase abnormality determination means determines that there is an abnormality regarding the state of temperature increase of the exhaust gas, it may be determined that the exhaust gas temperature increase means has an abnormality, and the operation of the exhaust gas temperature increase means may be stopped.

In the first and second aspects, the exhaust gas temperature increase monitor means may include an exhaust gas temperature sensor provided at a suitable location in the exhaust passage, and the exhaust gas temperature increase monitor means may monitor the state of temperature increase of the exhaust gas based on an exhaust gas temperature detected by the exhaust gas temperature sensor. The suitable location at which the exhaust gas temperature sensor is provided may be, for example, a location in the exhaust passage upstream of the exhaust throttle valve.

In the first and second aspects, the exhaust gas temperature increase monitor means may include a back pressure sensor provided at a location in the exhaust passage upstream of a location of the exhaust throttle valve, and the exhaust gas temperature increase monitor means may monitor the state of temperature increase of the exhaust gas based on a back pressure detected by the back pressure sensor.

The back pressure sensor is included in the exhaust gas temperature increase monitor means because changes in the back pressure are in association with changes in the exhaust gas temperature.

In the first and second aspects, the exhaust gas temperature increase monitor means may include a back pressure sensor and an exhaust gas temperature sensor that are provided in a portion of the exhaust passage upstream of the exhaust throttle valve. When a value detected by the back pressure and a value detected by the exhaust gas temperature sensor are within their respective target ranges, the monitor means abnormality determination means may determine that there is no abnormality regarding the state of temperature increase of the exhaust gas.

The target range of the back pressure refers to values of back pressure that are included within such a range that the exhaust gas temperature is likely to reach the target exhaust gas temperature during the exhaust temperature raising control. The back pressure has a great effect on the exhaust gas temperature, so that if a certain exhaust gas temperature can be secured by adjustment of the back pressure, it becomes easier to bring the exhaust gas temperature to the target exhaust gas temperature.

In the first and second aspects, the exhaust gas temperature increase stop means may stop the operation of the exhaust gas temperature increase means by opening the exhaust throttle valve and stopping performance of the sub-injection.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the exhaust temperature raising apparatus for an internal combustion engine of the invention will be described with reference to the accompanying drawings.

(FIRST EMBODIMENT)

A first embodiment of the invention will be described with reference to FIGS. 1 and 2.

Figure 1:
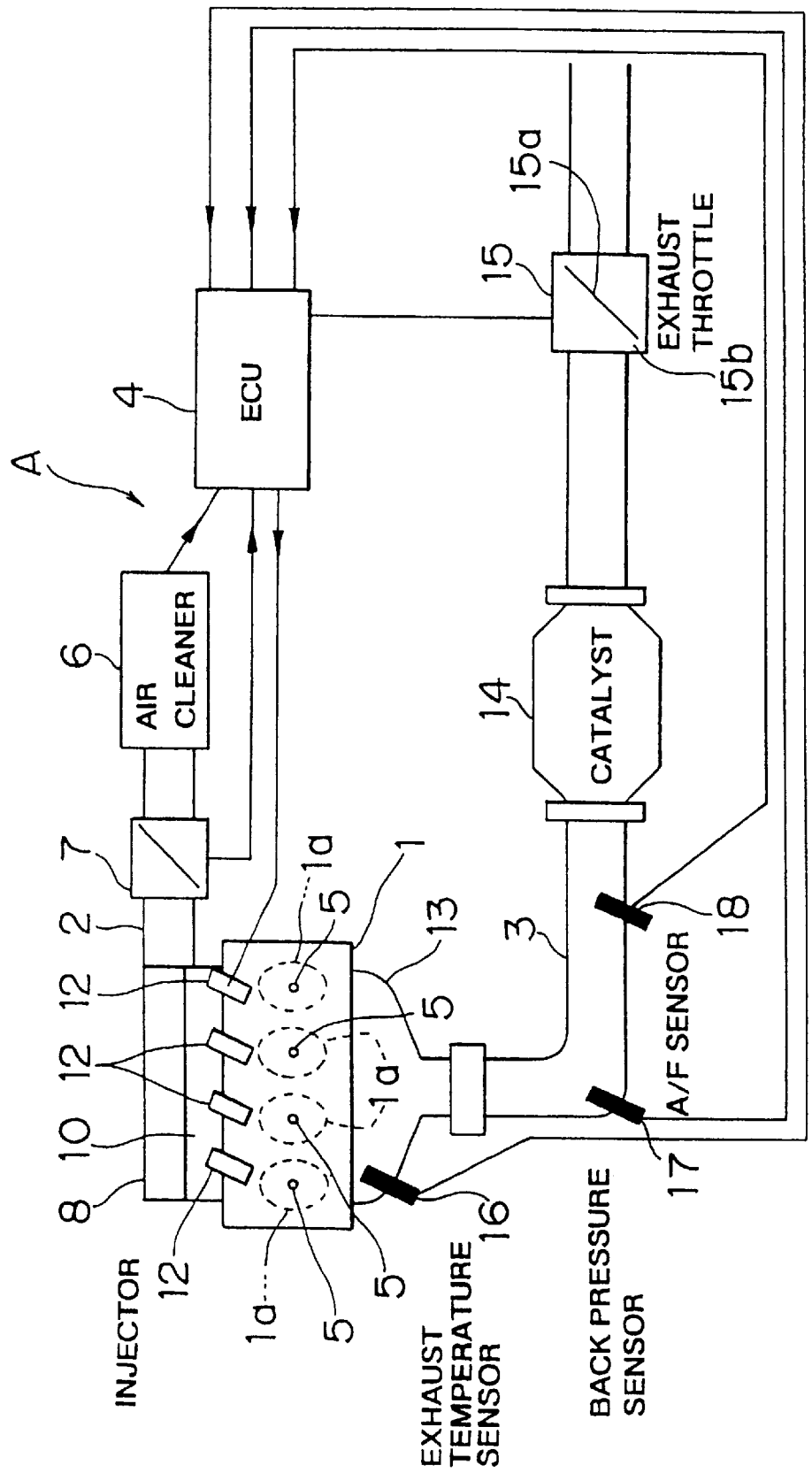
FIG. 1 is a schematic diagram illustrating a construction of an internal combustion engine exhaust temperature raising apparatus according to first and second embodiments of the invention.
Figure 2:
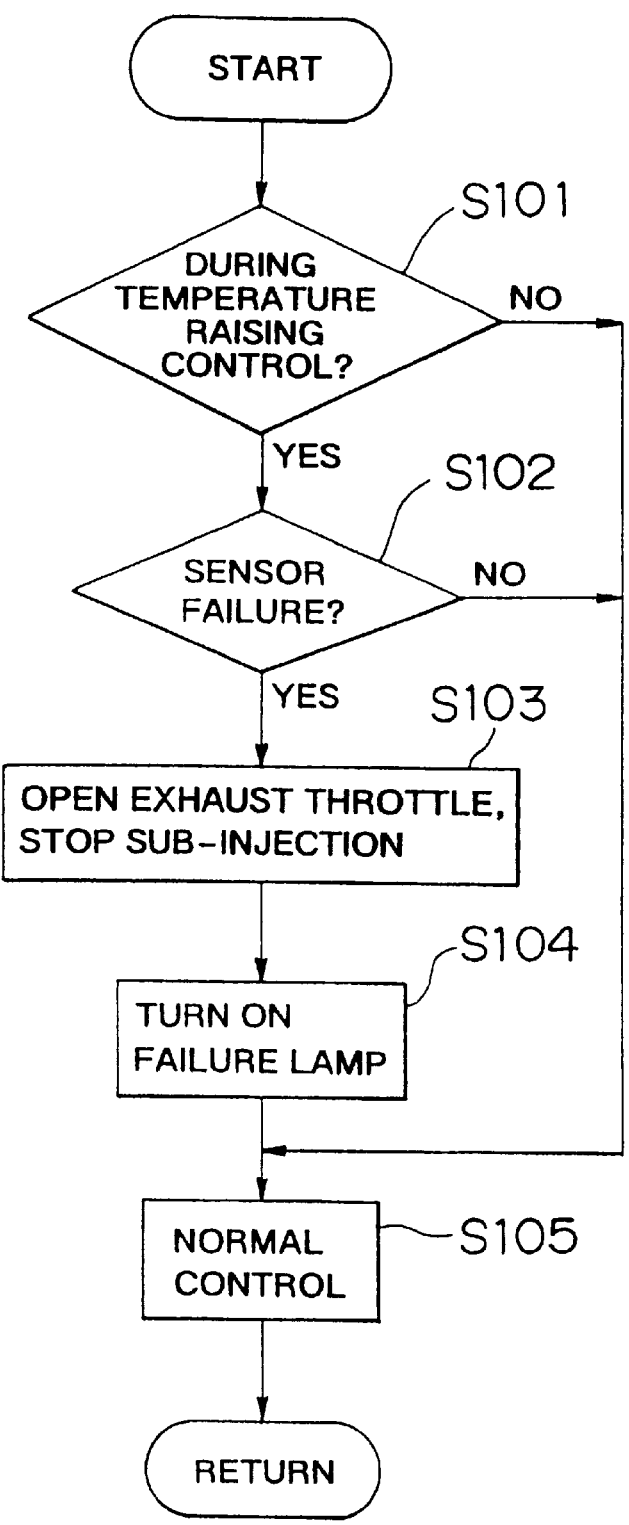
FIG. 2 is a flowchart illustrating an exhaust temperature raising control failure determining routine in the first embodiment of the invention.

FIG. 1 is a schematic illustration of a lean-burn engine A (hereinafter, referred to as "engine A") that includes an internal combustion engine exhaust temperature raising apparatus according to the invention.

The engine A is a four-cylinder four-stroke engine having a cylinder block 1 in which four cylinders 1a are formed. Each cylinder 1a has a combustion chamber (not shown) to which an intake passage 2 and an exhaust passage 3 are connected in communication. The operation of the engine A is controlled by an ECU 4 that is an engine control unit.

The cylinder block 1 is provided with ignition plugs 5 corresponding to the individual cylinders 1a.

Each ignition plug 5 performs ignition based on an ignition signal distributed by a distributor (not shown).

The distributor distributes a high voltage outputted from an igniter to each ignition plug 5 synchronously with the crank angle of the engine A. The distributor and the igniter are not shown in the drawings.

The intake passage 2 is provided with an air cleaner 6 for filtering air from outside, a throttle valve 7 for adjusting the amount of intake air flowing in the intake passage 2, a surge tank 8 for smoothing pulsating flows of intake air, and an intake manifold 10 provided as an intake air distribution pipe, which are disposed in that order in a direction from an upstream side toward the cylinder block 1. Thus, via these appliances and devices, external air is introduced into each cylinder 1a.

Each cylinder 1a is provided with an injector 12, that is, a fuel injection valve that performs the main injection, that is, fuel injection for producing engine output, and the sub-injection, that is, subsidiary fuel injection that follows the main injection, into the cylinder 1a.

In each combustion chamber, a mixture of intake air introduced from the intake passage 2 and fuel injected from the injector 12 burns upon ignition by the ignition plug 5, so that the driving force for the engine A is produced. Combustion gas produced in each combustion chamber is emitted into the atmosphere via the exhaust passage 3.

The exhaust passage 3 is provided with an exhaust manifold 13, that is, an exhaust collection pipe, a catalytic converter 14 as an emission control device, and an exhaust throttle valve 15 disposed downstream of the catalytic converter 14 for adjusting the back pressure in the exhaust passage 3 by adjusting the amount of exhaust gas flowing in the exhaust passage 3 based on the amount of the throttle aperture of the valve, which are disposed in that order in a direction from the cylinder block 1 toward a downstream side.

The exhaust manifold 13 has an exhaust air temperature sensor 16 for detecting the exhaust gas temperature.

An internal space of the catalytic converter 14 is filled with an emission control catalyst (not shown), whereby exhaust gas flowing in the exhaust passage 3 is controlled or cleaned before being emitted into the atmosphere.

The exhaust throttle valve 15 is formed by a valve body 15a that actually performs exhaust throttling, and a valve body opening-closing mechanism 15b that opens and closes the valve body 15a. The valve body opening-closing mechanism 15b is electrically connected to the ECU 4, and opens or closes the valve body 15a when necessary, based on an execution instruction from the ECU 4.

A portion of the exhaust passage 3 between the exhaust manifold 13 and the catalytic converter 14, that is, a portion upstream of the exhaust throttle valve 15, is provided with a back pressure sensor 17 and an air-fuel-ratio sensor 18 disposed downstream of the back pressure sensor 17.

The ECU 4 is a digital computer that, although not shown, is formed by a central processing control unit (CPU), a read-only memory (ROM), a random access memory (RAM), an input interface circuit, an output interface circuit, etc., which are interconnected by a bidirectional bus, as well known.

The input interface circuit is connected to the sensors 16, 17, 18 and other sensors (not shown) via electric wiring. The output interface is connected, via electric wiring, to appliances and devices that control the operation of the engine, such as the throttle valve 7, the injectors 12, the exhaust throttle valve 15, etc.

The various sensors output electric signals corresponding to values detected thereby, to the ECU 4. Based on the output signal values from the sensors, the ECU 4 comprehensively determines an operation state of the cylinder block 1. In accordance with needs, the ECU 4 controls the throttle valve 7, the ignition plugs 5, the injectors 12, the exhaust throttle valve 15, etc.

Under the control of the ECU 4, the injectors 12 function as main injection execution means for injecting fuel into the cylinders in an excess-air condition so as to produce an engine output, and function as a sub-injection execution means for injecting fuel subsidiarily to the fuel injected by execution of the main injection. The sub-injection in addition the main injection achieves additional fuel combustion to heat engine exhaust gas to a high temperature. To maintain the high-temperature state of exhaust gas, exhaust throttling is performed by the exhaust throttle valve 15.

The temperature increasing effect can be explained in a description of a result of control of the injectors 12 and the exhaust throttle valve 15 under the control of the ECU 4. That is, during operation of the engine A, the ECU 4 raises the exhaust gas temperature by executing and controlling the combustion attributed to the main injection in the excess-air condition for producing the engine output and to the sub-injection, that is, subsidiary fuel injection performed after execution of the main injection, and by executing and controlling the exhaust throttling using the exhaust throttle valve 15. Therefore, the ECU 4, and the injectors 12 and the exhaust throttle valve 15 operated under the control of the ECU 4 may be regarded as exhaust gas temperature raising means.

The exhaust air temperature sensor 16 and the back pressure sensor 17 monitor exhaust gas temperature increases achieved by the ECU 4, that is, the exhaust gas temperature raising means. That is, based on the exhaust gas temperature and the back pressure indicated by the sensors, exhaust gas temperature increase is monitored. Thus, the two sensors are referred to as exhaust gas temperature increase monitor means. The back pressure sensor 17 is included in the exhaust gas temperature increase monitor means because changes in the back pressure are in direct association with changes in exhaust gas temperature.

The ECU 4 also functions as monitor means abnormality determination means for determining whether an abnormality is present in the sensors 16, 17, that is, the exhaust gas temperature increase monitor means. If the ECU 4, as the monitor means abnormality determination means, determines that an abnormality is present in the exhaust air temperature sensor 16 or the back pressure sensor 17, the ECU 4 stops the function of the exhaust gas temperature increase means provided in the ECU 4. That is, the exhaust gas temperature increase means stops its operation. As a result, the temperature raising control discontinues. Thus, the ECU 4 also functions as exhaust gas temperature increase stop means. The operation of the ECU 4 having the aforementioned functions realizes an exhaust temperature raising apparatus for an internal combustion engine.

When either one of the sensors has an abnormality due to a failure or the like, the exhaust temperature raising apparatus stops execution of closure of the exhaust throttle valve 15 (that is, opens the exhaust throttle valve 15), and stops execution of the sub-injection from the injectors 12.

Furthermore, when component elements of the exhaust temperature raising apparatus other than the sensors, that is, appliance or devices related to the raising of engine exhaust gas, such as the injectors 12, the exhaust throttle valve 15 and the like, become abnormal due to a failure or the like, it is also possible to stop execution of closure of the exhaust throttle valve 15 (that is, opens the exhaust throttle valve 15) and stop execution of sub-injection from the injectors 12.

Since the execution of closure of the exhaust throttle valve 15 and the execution of sub-injection from the injectors 12 have great effects in raising exhaust gas as mentioned above, the stop of operation of the exhaust throttle valve 15 and the sub-injection from the injectors 12 means a stop of operation of the exhaust temperature raising apparatus.

A program for stopping the operation of the exhaust throttle valve 15 and the sub-injection of the injectors 12 is stored in a ROM of the ECU 4, and is called by the CPU when necessary.

The program will be described with reference to the flowchart of FIG. 2. The processing of each step of the program is executed by the CPU of the ECU 4.

First in step S101, the CPU determines whether a temperature raising control is being executed during an engine operation state in which it is highly necessary to lessen unburned fuel components in exhaust gas, for example, during a warm-up operation state, a low-speed and low-load operation state, or the like, that is, whether the engine A is in a state in which an exhaust temperature raising control is being executed based on execution of the sub-injection and operation of the exhaust throttle valve 15 in addition to the combustion attributed to main injection in an excess-air condition.

If the determination in step S101 is affirmative, the CPU proceeds to S102. If the determination in step S101 is negative, the CPU proceeds to S105. In step S102, the CPU determines whether there is a failure in the sensor 16 or 17. More specifically, for example, if there is a broken wire between the sensor and the ECU 4, the electrical connection between the sensor and the ECU 4 is cut off at the time of the break, so that it is determined that the sensor has a failure.

Thus, step S102 functions as monitor means abnormality determination means for determining whether there is a sensor abnormality. Step S102 is included in the procedure of the program stored in the ROM of the ECU 4, and the attributes of step S102 exist in the ECU 4. Therefore, the ECU 4 can be said to be means for determining whether abnormality is present in sensors and the like.

If the determination in step S102 is affirmative, the CPU proceeds to step S103. If the determination is negative, the CPU proceeds to step S105. In step S103, the CPU opens the exhaust throttle valve 15, which has been closed due to execution of exhaust throttling during the execution of the temperature raising control, and stops the sub-injection of the injectors 12.

If the exhaust throttling for execution of the temperature raising control is continued and the sub-injection is executed when the exhaust air temperature sensor 16 or the like, that is, exhaust gas temperature increase monitor means, has failed and is not normally functioning, there is a danger of an uncontrolled increase in the amount of combustion. Should that happens, the exhaust gas temperature will abnormally rise, causing unexpected increases of HCs and heat deterioration of the catalyst.

Therefore, step S103 of opening the exhaust throttle valve 15 and stopping the sub-injection by the injectors 12 functions as an exhaust gas temperature increase stop means for stopping the operation of the exhaust gas temperature increase means when it is determined in step S102 that there is a sensor abnormality. The attributes of step S103 exist in the ECU 4 as in the case of step S102. Therefore, the ECU 4 can be said to be exhaust gas temperature increase stop means.

In step S104, the CPU informs a driving person or a passenger that there is a sensor failure, by a failure a indicator lamp (not shown) provided in a passenger compartment, or a warning sound or the like.

Subsequently in step S105 following the processing of steps S101–S104, the CPU proceeds to an exhaust gas temperature control (hereinafter, referred to as "normal control") executed before the start of the exhaust temperature raising control. After that, the CPU returns to step S101 to repeat the routine in accordance with needs.

Thus, in the engine A of the first embodiment, if during the exhaust temperature raising control, the ECU 4, as monitor means abnormality determination means, determines that due to a failure of the exhaust air temperature sensor 16 or the like, which is an exhaust gas temperature increase monitor means, the expected function of the control cannot be carried out, that is, determines that there is a sensor failure, the ECU 4 performs the function of the exhaust gas temperature increase stop means to close the exhaust throttle valve 15, which has been open for an exhaust gas temperature increase, and to stop the execution of sub-injection of the injectors 12.

Therefore, it becomes possible to prevent an expected increase in the amount of combustion caused by occurrence of n abnormal state, such as a sensor failure or the like. Hence, it becomes possible to prevent unexpected increases of unburned HCs or heat deterioration of the catalyst caused by an abnormal exhaust gas temperature increase.

(SECOND EMBODIMENT)

A second embodiment of the invention will be described with reference to FIGS. 3 and 4.

The second embodiment differs from the first embodiment as follows.

In the first embodiment, the operation of the exhaust gas temperature increase means is stopped when a failure occurs in a sensor that is an exhaust gas temperature increase monitor means. In the second embodiment, when a value provided by an exhaust air temperature sensor or a back pressure sensor that indicates a temperature of exhaust gas is different from a predetermined value, it is simply determined that the exhaust temperature raising apparatus has an abnormality, aside from the determination as to which part of the exhaust temperature raising apparatus has an abnormality, and the operation of the exhaust gas temperature increase means is stopped.

Therefore, the content of a program for stopping the operation of the exhaust gas temperature increase stop means and portions related to the content of the program will be specifically described. Portions of the second embodiment substantially the same as those of the first embodiment are represented by the same reference numerals in the drawings, and will not be described again.

Figure 3:
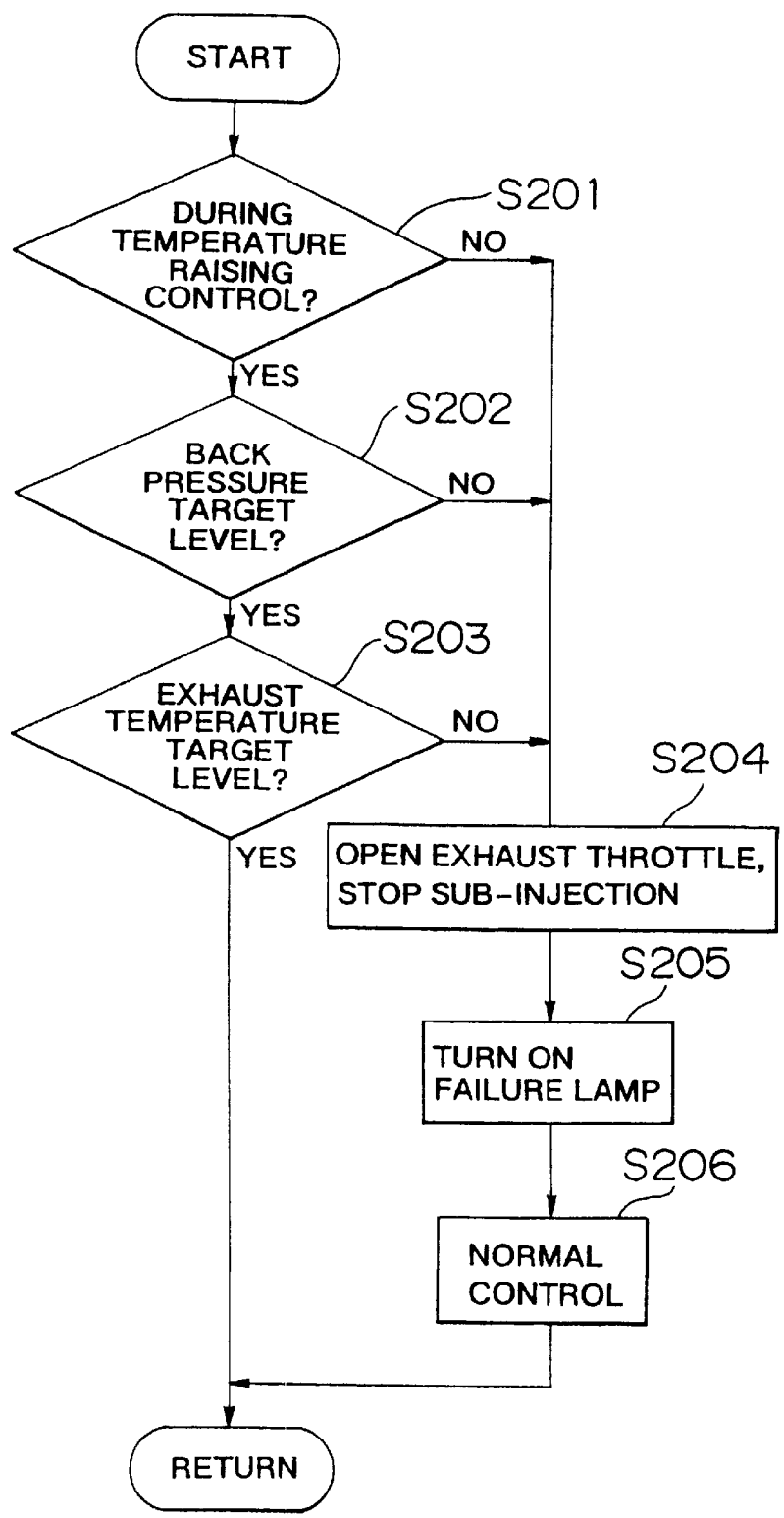
FIG. 3 is a flowchart illustrating an exhaust temperature raising control failure determining routine in the second embodiment of the invention.

FIG. 3 shows a flowchart (described below) regarding the aforementioned program.

Figure 4:
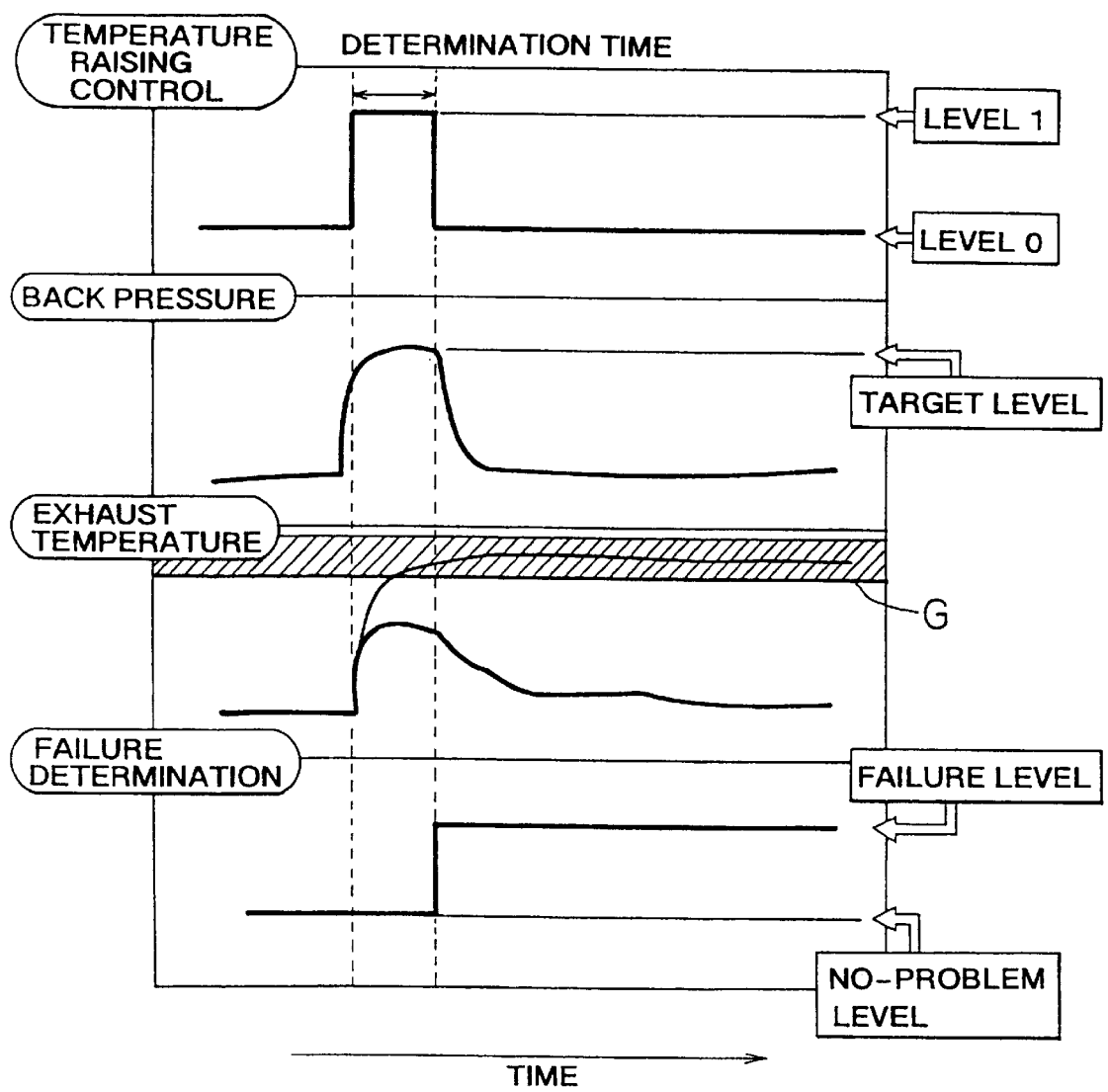
FIG. 4 is a diagram for determining whether the exhaust temperature raising apparatus has a failure.

FIG. 4 is a diagram for determining that a failure has occurred somewhere in the exhaust temperature raising apparatus if the back pressure or the exhaust gas temperature does not reach its target level (target range), that is, a predetermined temperature value, during a predetermined length of time during which the exhaust temperature raising control is being executed.

The predetermined length of time during which the exhaust temperature raising control is being executed is suitably set as a determination time that is needed to determine whether there is a failure. Therefore, FIG. 4 indicates whether the cylinder block 1 is in a failed state immediately after the determination time.

In FIG. 4, the horizontal axis indicates time, and the vertical axes indicate, from above, whether the exhaust temperature raising control of the engine A is being executed, the value of back pressure, the value of exhaust gas temperature, and whether a failure is detected within the determination time.

As for the levels indicated in the graph regarding the exhaust temperature raising control (hereinafter, referred to as "exhaust temperature raising control graph"), a graph line segment at level 1 indicates that the exhaust temperature raising control is being executed, and a graph line segment at level 0 indicates that the exhaust temperature raising control is not being executed.

A predetermined time slot in the graph is set as a determination time. It is determined whether a failure is present based on the back pressure or the exhaust gas temperature occurring during the determination time.

Since the graph line is at level 1 during the determination time in the exhaust temperature raising control graph, it is indicated that the engine A is in an exhaust temperature raising controlled state during the determination time.

The graph regarding back pressure (hereinafter, referred to as "back pressure graph") will next be described.

A target level (target range) indicated in the back pressure graph indicates that if the back pressure is at the target level, the exhaust gas temperature is likely to reach the target exhaust gas temperature during the execution of the exhaust temperature raising control. The back pressure has a great effect on the exhaust gas temperature. If a certain exhaust gas temperature is secured through adjustment of the back pressure, it becomes easier to bring the exhaust gas temperature to the target exhaust gas temperature. The target level of the back pressure is not limited to a specified value, but may have a certain width, that is, may be set so as to mean values of back pressure belonging to a predetermined range.

The back pressure graph shown indicates that there is no abnormality in the back pressure since the back pressure reaches the state of the target level within the determination time. Next, a graph regarding the exhaust gas temperature (hereinafter, referred to as "exhaust gas temperature graph") will be described.

Shown in the exhaust gas temperature graph are a thin graph line indicating a state of normal increase of the exhaust gas temperature to a target exhaust gas temperature and a thick line indicating a state in which the exhaust gas temperature is not normal. The graph is provided with a gradation region G which is a region indicating a target exhaust gas temperature. In the gradation region G, the thin graph line indicates that the exhaust gas temperature is at the target exhaust gas temperature during a portion of the determination time and a subsequent time period.

In contrast, the thick graph line indicates that the exhaust gas temperature does not reach the target exhaust gas temperature during or after the determination time. The exhaust gas temperature not reaching the target exhaust gas temperature indicates, for example, that the exhaust throttle valve 15, the injectors 12, that is, the fuel injection valves, the ECU 4, or the like is in an abnormal state due to any cause.

A graph regarding failure determination (hereinafter, referred to as "failure determination graph" indicates whether a failure is present after the elapse of the determination time. Since it takes a certain time to make a determination regarding failure, that is, since instant determination is impossible, a certain time allowance is provided to secure reliability in the failure determination.

In the failure determination graph, a failure level and a no-problem (normal) level are indicated. The failure level is a level corresponding to a situation where the exhaust gas temperature is not at the target exhaust gas temperature. The no-problem level is a level corresponding to a situation where the exhaust gas temperature is at the target exhaust gas temperature. The failure level and the no-problem level correspond to the thick graph line and the thin graph line in the exhaust gas temperature graph, respectively.

In this embodiment, it is a premise that the back pressure is normal during the determination time. Therefore, if the exhaust gas temperature graph line is at a target exhaust gas temperature level at the end of the determination time, it is determined that there is no abnormality in the exhaust throttle valve 15, the injectors 12, that is, the fuel injection valves, the ECU 4, or the like. Conversely, if the exhaust gas temperature graph line is not at the target exhaust gas temperature level at the end of the determination time, it is determined that there is an abnormality in the exhaust throttle valve 15, the injectors 12, that is, the fuel injection valves, the ECU 4, or the like.

The flowchart of FIG. 3 will be described with reference to FIG. 4.

In step S201, it is determined whether a temperature raising control is being executed during an engine operation state in which it is highly necessary to lessen unburned fuel components in exhaust gas, for example, during a warm-up operation state, a low-speed and low-load operation state, or the like, that is, whether the engine A is in a state in which an exhaust temperature raising control is being executed based on execution of the sub-injection and operation of the exhaust throttle valve 15 in addition to the combustion attributed to main injection in an excess-air condition.

If in step S201, the CPU makes an affirmative determination (determination that the exhaust gas temperature graph line is at level 1), the CPU proceeds to step S202. If a negative determination (determination that the exhaust gas temperature graph line is at level 0) is made, the CPU proceeds to step S204.

In step S202, the CPU determines whether the detection value detected by the back pressure sensor 17 disposed in the exhaust passage, that is, the back pressure, equals the target level, that is, a predetermined value. If the determination in step S202 is affirmative, it is considered that the back pressure is at the target level, i.e., that there is no abnormality regarding the state of exhaust gas temperature increase, and the process proceeds to step S203. If the determination in step S202 is negative, it is considered that the back pressure is not at the target level, and the process proceeds to step S204. As mentioned above, the back pressure has a great effect on the exhaust gas temperature, that is, the exhaust gas temperature depends on the magnitude of the back pressure. Therefore, step S202 of determining whether the back pressure is at the target level is regarded as exhaust gas temperature increase abnormality determination means (ECU) for determining whether there is an abnormality regarding the state of exhaust gas temperature increase.

In step S203, the CPU determines whether the exhaust gas temperature is at the aforementioned target exhaust gas temperature, that is, the target level (see the exhaust gas temperature graph). If in step S203, the CPU makes an affirmative determination (determination that the exhaust gas temperature is within the gradation region G), that is, if the CPU determines that there is no abnormality regarding exhaust gas temperature increase, the CPU repeats this routine if necessary. If in step S203, the CPU makes a negative determination (determination that the exhaust gas temperature is not within the gradation region G), the CPU proceeds to step S204.

Since the exhaust gas temperature is desired to be at the target exhaust gas temperature, step S203 of determining whether the exhaust gas temperature is at the target exhaust gas temperature can be said to be an exhaust gas temperature increase abnormality determination means for determining whether there is an abnormality regarding exhaust gas temperature increase. If the determination in step S203 is affirmative, that is, if the exhaust gas temperature is within the gradation region G, it is determined that there is no failure (see the no-problem level in the failure determination graph). If the exhaust gas temperature is not within the gradation region G, it is determined that there is an abnormality (see the failure level in the failure determination graph).

Since steps S203 and S202 are included in the procedure of the program stored in the ROM of the ECU 4, and the attributes of step S203 and S202 exist in the ECU 4. Therefore, the ECU 4 can be said to be an exhaust gas temperature increase abnormality determination means.

In step S204, the CPU opens the exhaust throttle valve 15 and stops the sub-injection. Thus, step S204 functions as an exhaust gas temperature increase stop means for stopping the operation of the exhaust gas temperature increase means when it is determined in step S202 or S203 that at least one of the back pressure and the exhaust gas temperature is not at the target level. The attributes of step S204 exist in the ECU 4 as in the case of steps S202 and S203. Therefore, the ECU 4 can be said to be an exhaust gas temperature increase stop means.

In step S205, the CPU informs a driving person or a passenger that there is a failure in the exhaust throttle valve 15, the injectors 12, the ECU 4, or the like, by a failure indicator lamp (not shown) provided in a passenger compartment, or a warning sound or the like.

In step S206, the CPU discontinues the exhaust temperature raising control, and executes a control (hereinafter, referred to as "normal control") executed before the exhaust temperature raising control.

After that, the CPU returns to step S201 if necessary, to repeat the routine.

The program illustrated in FIG. 3 and the diagram shown in FIG. 4 are stored in the ROM, and are called by the CPU when necessary.

In the second embodiment, if within the determination time during the exhaust temperature raising control, the detection value provided by the exhaust air temperature sensor 16 or the detection value provided by the back pressure sensor 17 does not reach the target level, that is, if the ECU 4, as an exhaust gas temperature increase abnormality determination means, determines that there is an abnormality regarding the state exhaust gas temperature increase, it is considered that there is an abnormality in the exhaust gas temperature increase means, and the ECU 4, as an exhaust gas temperature increase stop means, stops the exhaust gas temperature increase means.

As a cause for the exhaust gas temperature remaining below the target exhaust gas temperature, that is, the target level, it is conceivable that an injector 12, that is, a component element of the exhaust gas temperature increase means, has a failure and is unable to supply fuel properly and, therefore, the combustion level is insufficient, and that the pressure in the exhaust passage 3 is insufficient due to a malfunction of the exhaust throttle valve 15, or the like, and that the exhaust air temperature sensor 16 has an abnormality and cannot provide an accurate detection value, and so on.

If in such a case, the operation of the exhaust temperature raising apparatus is continued by closing the exhaust throttle valve 15 and executing the sub-injection in addition to the main injection in an excess-air state, undesired excessive combustion may be caused, so that the amount of unburned HCs may further increase or the catalyst temperature may increase more than necessary. Therefore, if an abnormality is detected as described above, the ECU 4, as an exhaust gas temperature increase stop means, stops the operation of the exhaust gas temperature increase means, in order to prevent an unexpected increase in the amount of HCs and an abnormal rise in the temperature of the catalyst.

While the present invention has been described with reference to what are presently considered to be preferred embodiments thereof, it is to be understood that the present invention is not limited to the disclosed embodiments or constructions. On the contrary, the present invention is intended to cover various modifications and equivalent arrangements.

What is claimed is:

1. An exhaust temperature raising apparatus for an internal combustion engine, comprising:

an exhaust throttle valve that is provided in an exhaust passage of the internal combustion engine and that adjusts an amount of an exhaust gas flowing in the exhaust passage based on an amount of throttling by the exhaust throttle valve;

a fuel injection valve that performs a main injection that is a fuel injection for producing an engine output and a sub-injection that is a subsidiary fuel injection after performance of the main injection, directly into a cylinder;

an exhaust gas temperature increase means for, during an engine operation during which a need to lessen an unburned fuel component contained in an exhaust gas is high, performing and controlling exhaust throttling by the exhaust throttle valve and performing and controlling an exhaust gas temperature increase through combustion attributed to the main injection performed in an excess-air condition by the fuel injection valve and combustion attributed to the sub-injection;

an exhaust gas temperature increase monitor means for monitoring a state of temperature increase of the exhaust gas caused by performance of the exhaust gas temperature increase means;

a monitor means abnormality determination means for determining whether the exhaust gas temperature increase monitor means has an abnormality; and an exhaust gas temperature increase stop means for stopping an operation of the exhaust gas temperature increase means when the monitor means abnormality determination means determines that the exhaust gas temperature increase monitor means has an abnormality, wherein the exhaust gas temperature increase monitor means includes a back pressure sensor provided at a location in the exhaust passage upstream of a location of the exhaust throttle valve, and the exhaust gas temperature increase monitor means monitors the state of temperature increase of the exhaust gas based on a back pressure detected by the back pressure detector.

2. An exhaust temperature raising apparatus according to claim 1, wherein the exhaust gas temperature increase monitor means further includes an exhaust gas temperature sensor provided at a suitable location in the exhaust passage, and the exhaust gas temperature increase monitor means monitors the state of temperature increase of the exhaust gas based on the back pressure detected by the back pressure detector and an exhaust gas temperature detected by the exhaust gas temperature sensor.

3. An exhaust temperature raising apparatus according to claim 1, wherein the exhaust gas temperature increase monitor means includes an exhaust gas temperature sensor provided in a portion of the exhaust passage upstream of the exhaust throttle valve, and wherein when a value detected by the back pressure sensor and a value detected by the exhaust gas temperature sensor are within target ranges, respectively, the monitor means abnormality determination means determines that there is no abnormality regarding the state of temperature increase of the exhaust gas.

4. An exhaust temperature raising apparatus according to claim 1, wherein the exhaust gas temperature increase stop means stops the operation of the exhaust gas temperature increase means by opening the exhaust throttle valve and stopping performance of the sub-injection.

5. An exhaust temperature raising apparatus according to claim 2,
wherein the monitor means abnormality determination means determines whether at least one of the back pressure sensor and the exhaust gas temperature sensor has an abnormality.

6. An exhaust temperature raising apparatus for an internal combustion engine, comprising:
an exhaust throttle valve that is provided in an exhaust passage of the internal combustion engine and that adjusts an amount of an exhaust gas flowing in the exhaust passage based on an amount of throttling by the exhaust throttle valve;
a fuel injection valve that performs a main injection that is a fuel injection for producing an engine output and a sub-injection that is a subsidiary fuel injection after performance of the main injection, directly into a cylinder;
an exhaust gas temperature increase means for, during an engine operation during which a need to lessen an unburned fuel component contained in an exhaust gas is high, performing and controlling exhaust throttling by the exhaust throttle valve and performing and controlling an exhaust gas temperature increase through combustion attributed to the main injection performed in an excess-air condition by the fuel injection valve and combustion attributed to the sub-injection;
an exhaust gas temperature increase monitor means for monitoring a state of temperature increase of the exhaust gas caused by performance of the exhaust gas temperature increase means;
an exhaust gas temperature increase abnormality determination means for determining whether there is an abnormality regarding the state of temperature increase of the exhaust gas monitored by the exhaust gas temperature increase monitor means; and
an exhaust gas temperature increase stop means for stopping an operation of the exhaust gas temperature increase means when the exhaust gas temperature increase abnormality determination means determines that there is an abnormality regarding the state of temperature increase of the exhaust gas,
wherein the exhaust gas temperature increase monitor means includes a back pressure sensor provided at a location in the exhaust passage upstream of a location of the exhaust throttle valve, and the exhaust gas temperature increase monitor means monitors the state of temperature increase of the exhaust gas based on a back pressure detected by the back pressure detector.

7. An exhaust temperature raising apparatus according to claim 6, wherein when the exhaust gas temperature increase abnormality determination means determines that there is an abnormality regarding the state of temperature increase of the exhaust gas, it is determined that the exhaust gas temperature increase means has an abnormality, and the operation of the exhaust gas temperature increase means is stopped.

8. An exhaust temperature raising apparatus according to claim 6, wherein the exhaust gas temperature increase monitor means further includes an exhaust gas temperature sensor provided at a suitable location in the exhaust passage, and the exhaust gas temperature increase monitor means monitors the state of temperature increase of the exhaust gas based on the back pressure detected by the back pressure detector and an exhaust gas temperature detected by the exhaust gas temperature sensor.

9. An exhaust temperature raising apparatus according to claim 6, wherein the exhaust gas temperature increase stop means stops the operation of the exhaust gas temperature increase means by opening the exhaust throttle valve and stopping performance of the sub-injection.

10. An exhaust temperature raising apparatus according to claim 6,
wherein the monitor means abnormality determination means determines whether there is an abnormality regarding the state of temperature increase of the exhaust gas, based on at least one of a detection value provided by the back pressure sensor and a detection value provided by the exhaust gas temperature sensor.

11. An exhaust gas temperature raising apparatus for an internal combustion engine, comprising:
an exhaust throttle valve that is provided in an exhaust passage of the internal combustion engine and that adjusts an amount of an exhaust gas flowing in the exhaust passage based on an amount of throttling of the exhaust throttle valve;
a fuel injection valve that performs a main injection that is a fuel injection for producing an engine output and a sub-injectin that is a subsidiary fuel injection after performance of the main injection, directly into a cylinder;
an exhaust gas temperature increase device for, during an engine operation during which a need to lessen an unburned fuel component contained in an exhaust gas is high, performing and controlling exhaust throttling by the exhaust throttle valve and performing and controlling an exhaust gas temperature increase through combustion attributed to the main injection performed in an excess-air condition by the fuel injection valve and combustion attributed to the sub-injection;
an exhaust gas temperature increase sensor for sensing a state of temperature increase of the exhaust gas caused by performance of the exhaust gas temperature increase device;
a sensor abnormality determination device for determining whether the exhaust gas temperature increase sensor has an abnormality; and
an exhaust gas temperature increase stop device for stopping an operation of the exhaust gas temperature increase device when the sensor abnormality determination device determines that the exhaust gas temperature increase sensor has an abnormality;
wherein the exhaust gas temperature increase sensor includes a back pressure sensor provided at a location in the exhaust passage upstream of a location of the exhaust throttle valve, and the exhaust gas temperature increase sensor monitors the state of temperature increase of the exhaust gas based on a back pressure detected by the back pressure detector.

12. An exhaust gas temperature raising apparatus for an internal combustion engine, comprising:
an exhaust throttle valve that is provided in an exhaust passage of the internal combustion engine and that adjusts an amount of an exhaust gas flowing in the exhaust passage based on an amount of throttling of the exhaust throttle valve;

a fuel injection valve that performs a main injection that is a fuel injection for producing an engine output and a sub-injection that is a subsidiary fuel injection after performance of the main injection, directly into a cylinder;

an exhaust gas temperature increase device for, during an engine operation during which a need to lessen an unburned fuel component contained in an exhaust gas is high, performing and controlling exhaust throttling by the exhaust throttle valve and performing and controlling an exhaust gas temperature increase through combustion attributed to the main injection performed in an excess-air condition by the fuel injection valve and combustion attributed to the sub-injection;

an exhaust gas temperature increase sensor for sensing a state of temperature increase of the exhaust gas caused by performance of the exhaust gas temperature increase device;

an exhaust gas temperature increase abnormality determination device for determining whether there is an abnormality regarding the state of temperature increase of the exhaust gas sensed by the exhaust gas temperature increase sensor; and an exhaust gas temperature increase stop device for stopping an operation of the exhaust gas temperature increase device when the exhaust gas temperature increase abnormality determination device determines that there is an abnormality regarding the state of temperature increase of the exhaust gas.

* * * * *

UNITED STATES PATENT AND TRADEMARK OFFICE
CERTIFICATE OF CORRECTION

PATENT NO. : 6,381,952 B1
DATED : May 7, 2002
INVENTOR(S) : Takamitsu Asanuma et al.

It is certified that error appears in the above-identified patent and that said Letters Patent is hereby corrected as shown below:

Column 9,
Line 51, delete "a" (third occurrence).

Column 10,
Line 7, change "n" to -- an --.

Column 16,
Line 14, change "claim 6" to -- claim 8 --.
Line 31, change "sub-injectin" to -- sub-injection --.

Column 18,
Line 14, change "gas." to -- gas, --.
Line 15, insert the following paragraph:
-- wherein the exhaust gas temperature increase sensor includes a back pressure sensor provided at a location in the exhaust passage upstream of a location of the exhaust throttle valve, and the exhaust gas temperature increase sensor monitors the state of temperature increase of the exhaust gas based on a back pressure detected by the back pressure detector. --.

Signed and Sealed this

Thirtieth Day of May, 2006

JON W. DUDAS
*Director of the United States Patent and Trademark Office*